May 24, 1949.　　　　　J. L. MOHAR　　　　　2,471,040
ELECTRIC SWITCH
Filed July 3, 1946　　　　　　　　　　　　　2 Sheets-Sheet 1
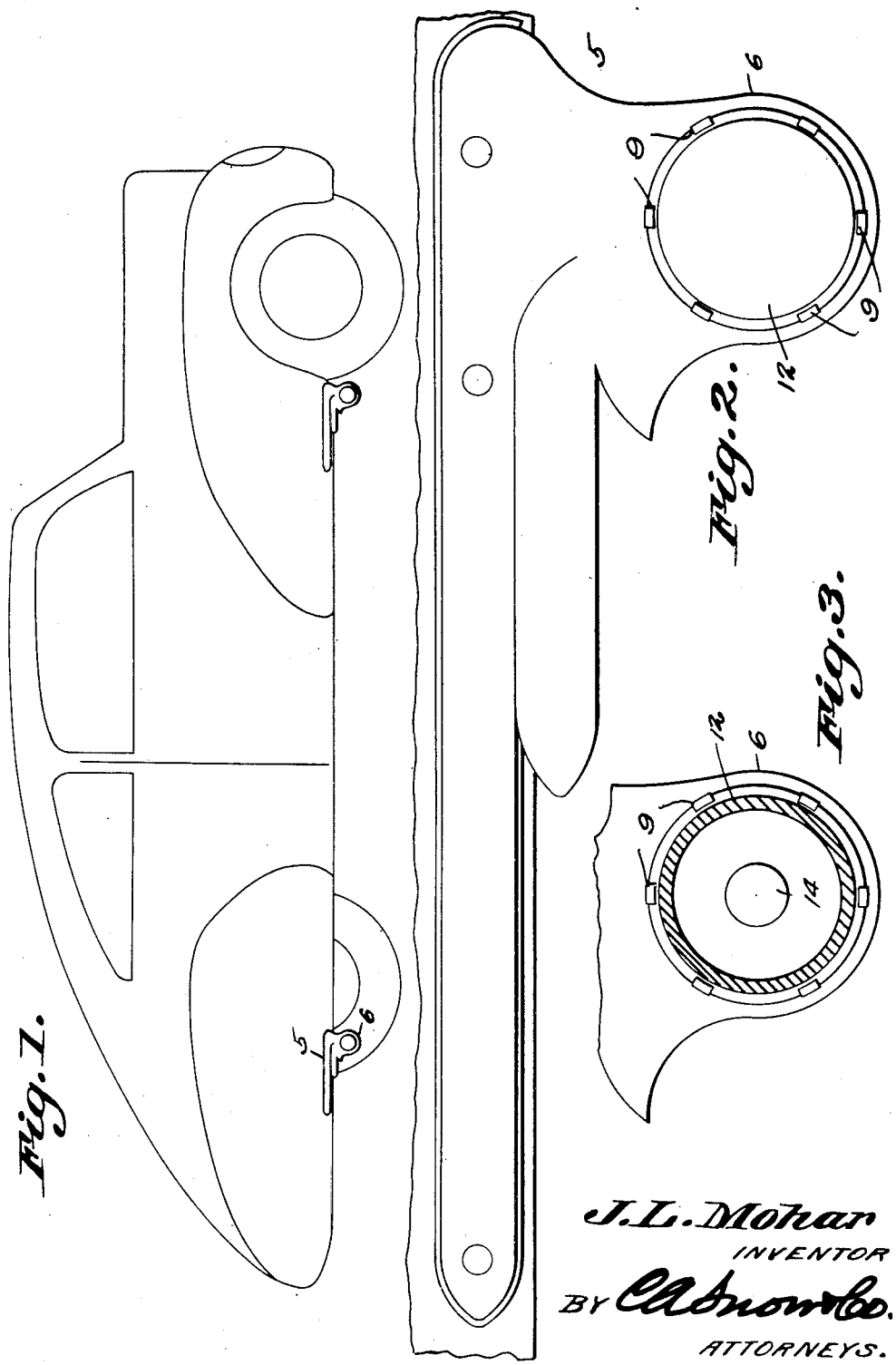
J. L. Mohar
INVENTOR
BY C.A.Snow & Co.
ATTORNEYS.

May 24, 1949.  J. L. MOHAR  2,471,040
ELECTRIC SWITCH
Filed July 3, 1946  2 Sheets-Sheet 2
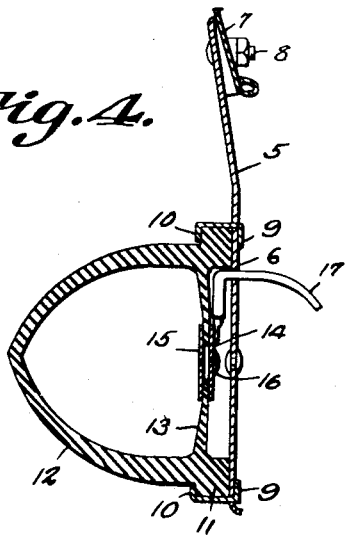
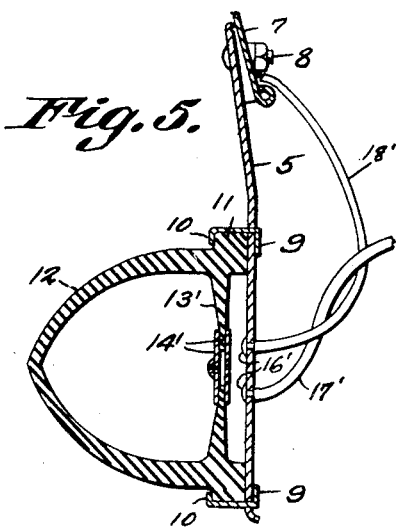
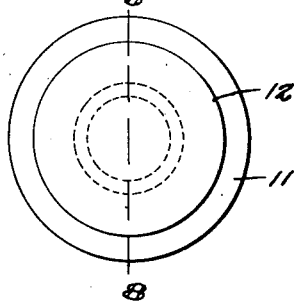
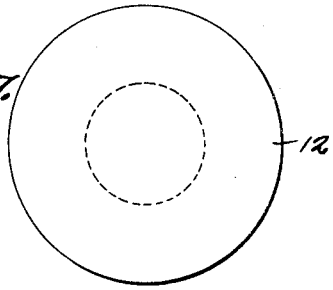
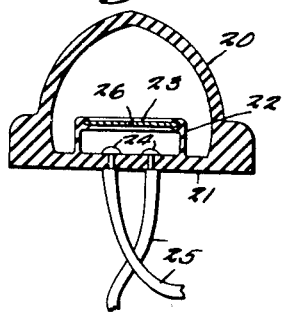
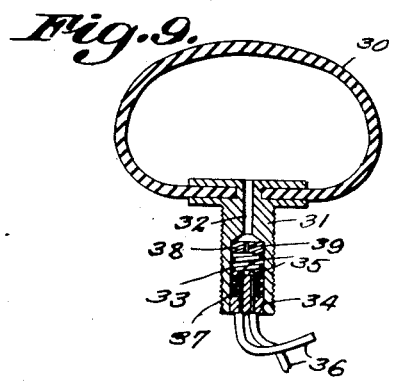
J. L. Mohar
INVENTOR
BY C.A.Snow & Co.
ATTORNEYS.

Patented May 24, 1949

2,471,040

UNITED STATES PATENT OFFICE 2,471,040

ELECTRIC SWITCH

Jack L. Mohar, Long Beach, Calif.

Application July 3, 1946, Serial No. 681,180

1 Claim. (Cl. 200—33)

This invention relates to a switch construction, and more particularly to pneumatically operated switches.

An important object of the invention is to provide a pneumatically operated switch designed for use in connection with motor vehicles, and located on the vehicles so that when the vehicles are moved into close proximity with obstructions such as curbings, posts or the like, the switches will be operated to complete a circuit causing an audible or visible signal indicating the position of the vehicle with respect to the obstruction, to the operator of the vehicle.

Another important object of the invention is to provide a vented, pneumatically operated switch which will maintain the circuit to the signal completed, for a predetermined period.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a side elevational view of a motor vehicle equipped with an electric switch constructed in accordance with the invention.

Figure 2 is an enlarged elevational view illustrating the switch as secured to the fender of a vehicle.

Figure 3 is a transverse, sectional view through the bulb or protruding member of the switch.

Figure 4 is a vertical sectional view through the switch.

Figure 5 is a vertical sectional view through a modified form of the invention.

Figure 6 is a front elevational view of the bulb or protruding section of the switch.

Figure 7 is a rear elevational view thereof.

Figure 8 is a sectional view taken on line 8—8 of Figure 6.

Figure 9 is a vertical sectional view through a modified form of switch.

Referring to the drawings in detail, the reference character 5 indicates a bracket which is constructed simulating a wing, the lower portion 6 thereof constituting a support for the switch forming the subject matter of the present invention, so that the switch is supported beyond the fender to which it is secured, it being understood that this particular type of switch is designed primarily for use on motor vehicle fenders.

As clearly shown, the bracket 5 is bolted to the lower edge of the fender 7 by means of bolts 8.

The lower portion 6 is offset so that it may extend vertically to support the switch in the proper position for contact with the curbing.

A plurality of openings arranged in the line of a circle are formed in the lower portion 6 and accommodate the inner ends of the clips 9, being bent over the annular rib formed integral with the rubber bulb 12, or protruding section of the switch, securing the bulb to the bracket.

Formed within the bulb 12 at a point adjacent to the base thereof, is a partition 13 formed with an opening to which the contact discs 14 are secured, the discs being arranged on opposite sides of the partition adjacent to the opening therein. These contact discs are formed with vents 15 through which air may enter the bulb 12, and exhaust therefrom when the bulb 12 is compressed and released.

Secured to one of the discs 14 is a contact member 16 which is also formed with an opening registering with the vent 15 of the discs 14 so that air passes through the contact member on its passage to and from the bulb.

A wire 17 leading to a signal not shown provides one wire of the circuit between the contact disc 14 at one side of the partition 13 and the signal, the ground for this circuit being made through the bracket 5 and the chassis of the vehicle.

As shown by Figure 5 of the drawings, the bulb 12 and contact discs 14' are mounted on the partition 13'. The innermost contact disc 14' is so arranged that it will bridge the contact points 16', completing the circuit to a signal through the wires 17' and 18', the wire 18' constituting the ground wire of the circuit which is connected with the bracket 5 supporting the switch.

As shown by Figure 8 of the drawings, the body portion, or rubber bulb, is indicated by the reference character 20, and has supported on the base 21 thereof an outwardly extended annular flange 22 formed with an annular groove in which the contact disc 23 is held. Contact members 24 extend into the base 21 of the bulb and are connected with the wires 25 that provide the circuit to the signal not shown. Thus it will be seen that when the bulb is moved into contact with a stationary object such as a curb or post, the bulb will be forced inwardly, compressing the air, which in turn forces the contact disc 23 into engagement with the contact members 24, completing the circuit. An opening 26 is formed centrally of the disc 23 so that air may pass into the space between the disc 23 and base 21, and exhaust therefrom when the bulb 20 returns to its normal extended position.

In the form of the invention as shown by Figure 9 of the drawings, the reference character 30 indicates a rubber bulb which is secured within an annular groove formed in the fitting 31, the fitting 31 being formed with a bore 32 having an enlarged outer portion 33 providing an air chamber between the plug 34 and inner end of the enlarged portion of the bore. This plug 34 is secured within the fitting 31 and closes the outer end thereof, the plug providing a support for the contact members 35 to which the wires 36 are connected, the wires 36 leading to the signal, not shown.

As shown, the plug 34 has a reduced inner end defining a shoulder against which the coiled spring 37 rests, the opposite end of the coiled spring 37 bearing against the movable disc 38 which is mounted within the enlarged portion 33 at the bore.

This disc 38 is formed with a vent 39 that communicates with the bore 32.

In this form of the invention, the compression within the bulb 30 caused by the bulb engaging a stationary object will act to force the disc 38 into engagement with the contact members 35, bridging the contact members, completing the circuit to cause the signal to be made.

While I have shown and described the switch mechanism as controlling the circuit to a signal of a motor vehicle to indicate the position of the vehicle with respect to stationary objects such as curbings, posts or the like, it is to be understood that it is contemplated to use this collapsible bulb-arcuated switch at any place desired, as for example in starting units, as the switch for use on engines where the starting unit is overloaded and may be engaged only for a short duration at a time. The switch will act to automatically break the contact at the desired time, thereby ensuring against damage to the starting unit.

It may also be found desirable to use this switch on ships and places where corrosion and weather proofing become a problem.

I claim:

In an electric switch, an inflated bulb, a bracket to which the bulb is secured, a stationary contact member mounted on the bracket directly opposite to the bulb, a flexible partition mounted within the bulb directly over the stationary contact member in spaced relation therewith, said partition having a central opening, and a movable contact member mounted on the flexible partition within the opening thereof and having vent openings, said movable contact member being movable into engagement with the stationary contact member completing a circuit under pressure, created within the bulb, when the bulb is compressed by contact with a stationary object.

JACK L. MOHAR.

REFERENCES CITED

The following references are of record in the file of this patent:

UNITED STATES PATENTS

| Number | Name | Date |
|---|---|---|
| 1,858,243 | Kuzmeth | May 17, 1932 |
| 2,178,156 | Williams | Oct. 31, 1939 |

FOREIGN PATENTS

| Number | Country | Date |
|---|---|---|
| 319,190 | Great Britain | Sept. 15, 1928 |